United States Patent [19]

Hucker

[11] Patent Number: 4,642,535
[45] Date of Patent: Feb. 10, 1987

[54] ELECTROMAGNETIC ENERGY STORAGE AND SUPPLY SYSTEM

[75] Inventor: David J. Hucker, Rockford, Ill.

[73] Assignee: Sundstrand Corporation, Rockford, Ill.

[21] Appl. No.: 566,518

[22] Filed: Dec. 29, 1983

[51] Int. Cl.[4] .............................................. H02K 7/02
[52] U.S. Cl. .................................... 318/161; 310/74; 322/4
[58] Field of Search .................. 318/161, 150; 310/74; 322/4, 8

[56] References Cited

U.S. PATENT DOCUMENTS

| | | |
|---|---|---|
| 1,476,978 | 12/1923 | Jeffrey . |
| 1,493,968 | 5/1924 | Davis . |
| 3,667,012 | 5/1972 | Kilgore . |
| 3,898,551 | 8/1975 | Webb .................................. 322/28 |
| 4,001,666 | 1/1977 | Grenfell ......................... 318/161 X |
| 4,200,831 | 4/1980 | Weldon et al. .................. 310/266 X |
| 4,255,782 | 3/1981 | Joyce ...................................... 363/8 |
| 4,266,180 | 5/1981 | Juran .............................. 318/161 X |
| 4,355,276 | 10/1982 | Vittay .............................. 310/74 X |
| 4,358,719 | 11/1982 | Currier et al. .................. 318/150 X |

FOREIGN PATENT DOCUMENTS 8301353 4/1983 World Int. Prop. O. ............ 310/74

Primary Examiner—William M. Shoop, Jr.
Assistant Examiner—Bentsu Ro
Attorney, Agent, or Firm—Wood, Dalton, Phillips, Mason & Rowe

[57] ABSTRACT

An electromagnetic energy storage and supply system for supplementing a main power supply to provide D.C. current to a pulsed load by providing that portion of the load current which is above the average load current commanded. The load current is sensed and compared to an average current command to provide a difference signal which is proportional to a desired supplemental current to be provided to the load. An inverter, coupled between the main power supply and a motor, is controlled during the off period of the pulsed load and in response to the difference signal to provide an A.C. signal to the motor which in turn drives an inertia device coupled thereto for storing energy. During the on period of the pulsed load the inertia device decelerates, discharging energy through the motor and inverter to provide the supplemental D.C. current to the load.

4 Claims, 4 Drawing Figures

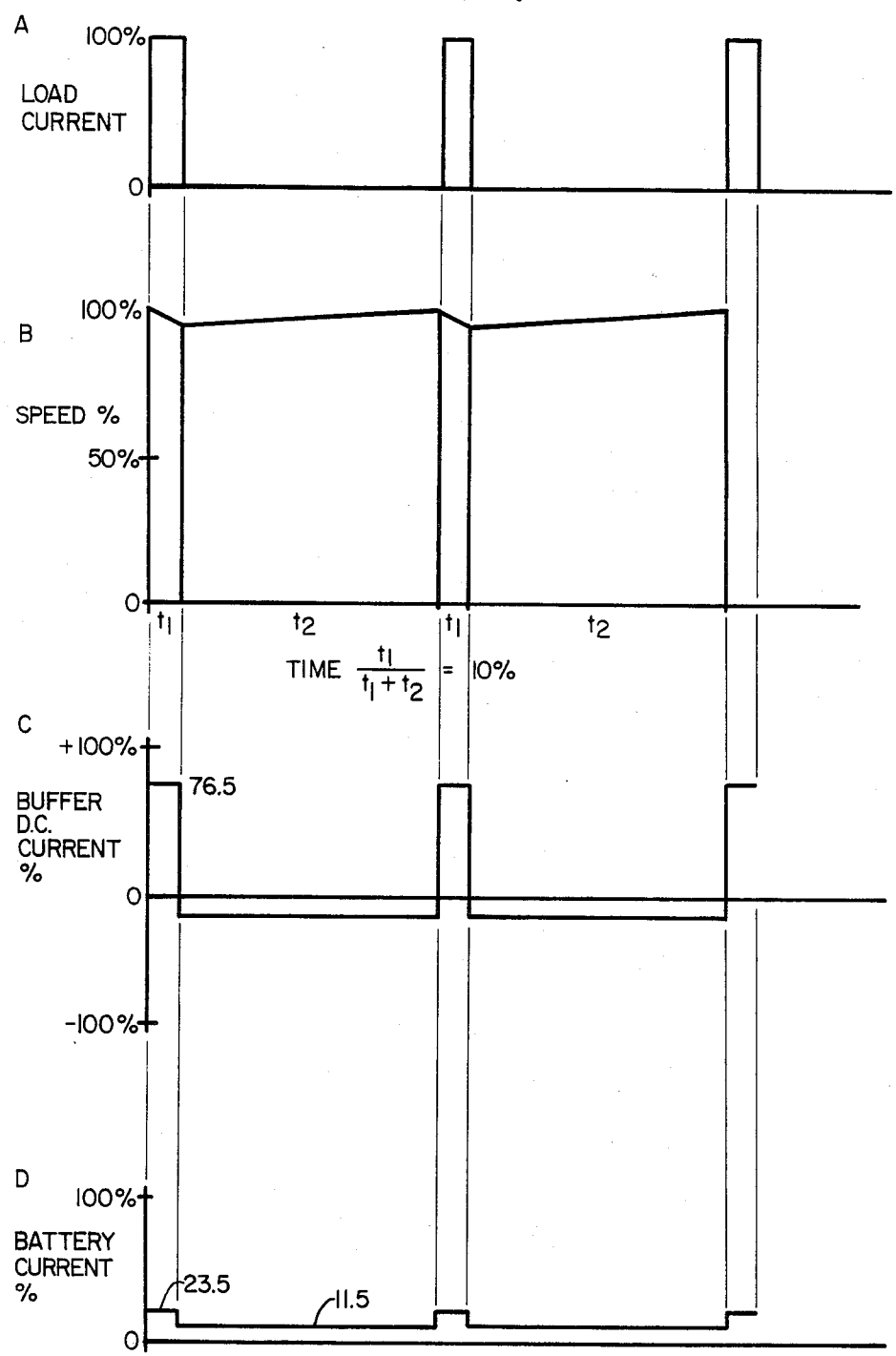

ELECTROMAGNETIC ENERGY STORAGE AND SUPPLY SYSTEM

TECHNICAL FIELD

The present invention relates to an electromagnetic energy storage and supply system and more particularly to an energy storage and supply system for providing D.C. current to a pulsed load to supplement a main power supply.

BACKGROUND OF THE INVENTION

Known electromagnetic energy storage and supply systems such as shown in Kilgore U.S. Pat. Nos. 3,667,012 and Grenfell 4,001,666 have employed an inertia device such as a flywheel to store energy during regenerative load conditions and to discharge energy during high load conditions so as to supplement a main power supply. Such systems are typically used with cyclically varying loads to provide an A.C. signal to the load.

Several aerospace applications such as high energy lasers and radars, however, require D.C. signals formed of a series of high energy pulses. The power supply for such loads is typically a battery sized to provide the peak pulse current required as opposed to the average current. In a typical orbiting system a battery sized for peak power may weigh thousands of pounds, the weight of the battery limiting the level of transmitter power achievable by such systems.

DISCLOSURE OF THE INVENTION

In accordance with the present invention the disadvantages of prior energy storage and supply systems as discussed above have been overcome.

The electromagnetic energy storage and supply system of the present invention supplements a main power supply providing D.C. current to a pulsed load by providing that portion of the load current which is above the average load current commanded. The system includes means for sensing the load current to provide a signal representative thereof. The load current signal is compared to an average current command to provide a difference signal which is proportional to a desired supplemental current to be provided to the load. In response to the difference signal, an energy storage and supply means stores energy from the main power supply during the "off" period of the load and provides D.C. current to the load during the "on" period of the load to supply that portion of the load current which is above the average current command.

The means for storing and supplying energy includes a motor, an inertia device coupled to the motor for storing and discharging energy, and an inverter coupled between the main power supply and the motor. The inverter is controlled in response to the difference signal to provide an A.C. voltage to the motor to drive the inertia device during the "off" periods of the pulsed load, the inertia device, when driven by the motor, being accelerated to store energy from the main power supply. During the "on" periods of the pulsed load, the inertia device decelerates, discharging energy through the motor and inverter to provide the supplemental D.C. current to the load.

BRIEF DESCRIPTION OF THE DRAWINGS

FIGS. 4A-D are graphs illustrating the operation of FIG. 1 for a 10% duty cycle system, the graphs representing respectively the load current, speed of the inertia device, supplemental current and battery current with respect to time.

BEST MODE FOR CARRYING OUT THE INVENTION

Figure 1:
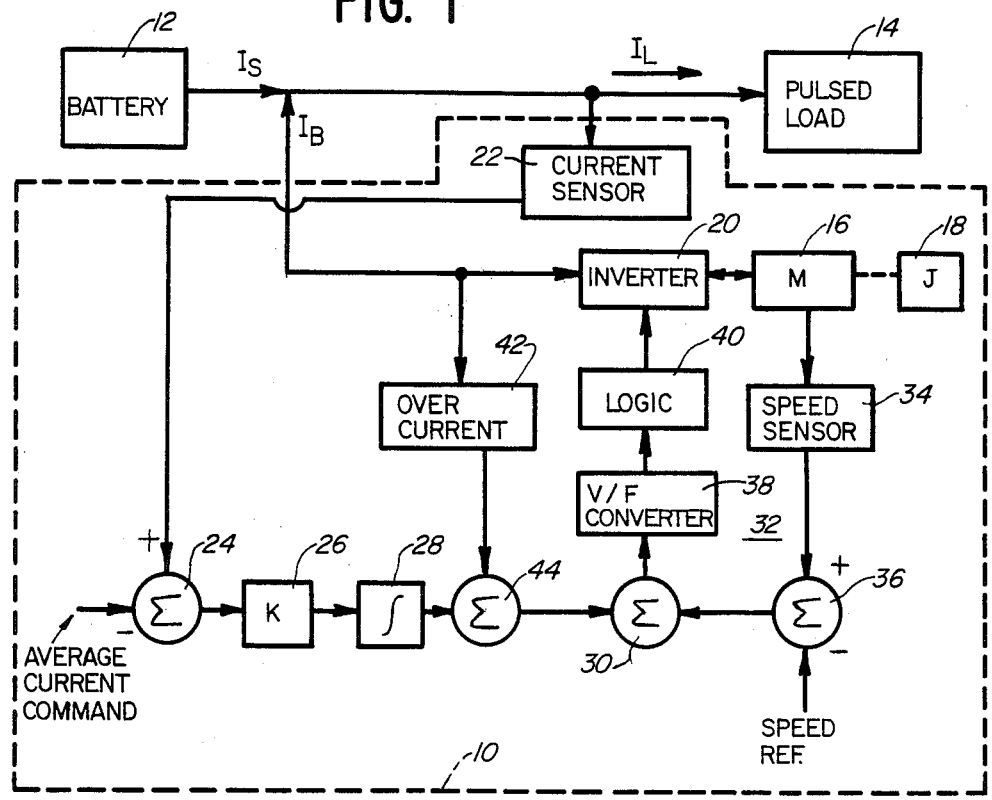
FIG. 1 is a block diagram of the electromagnetic energy storage and supply system of the present invention.

The electromagnetic energy storage and supply system 10 as shown in FIG. 1 supplements a main power supply or battery 12 to provide a D.C. current to a pulsed load 14, such as a laser or radar. The system 10 operates to provide that portion of the load current which is above the average load current commanded so that the battery may be sized to provide the average current to the load as opposed to the peak pulse current.

The energy storage and supply system 10 includes a motor 16 and an inertia device 18 for storing and discharging energy. An inverter 20 is coupled between the battery 12 and the motor 16 and is controlled as discussed below, to provide an A.C. voltage to the motor to drive the inertia device during the "off" periods of the pulsed load 14. The inertia device 18, when driven by the motor 16, accelerates to store energy from the main power supply 12. During the "on" period of the pulsed load, the inertia device 18 decelerates, discharging energy through the motor 16 and inverter 20 to provide a D.C. current, $I_B$, to the load to supplement the current $I_S$ provided by the battery 12.

In order to control the inverter 20 to provide the proper A.C. voltage to the motor to regulate the speed of the inertia device, the load current $I_L$ is sensed by a current sensor 22, the output of which is compared by a summing junction 24 to a signal representing the average current command to provide a system command signal. The system command signal output from the summing junction 24 represents the difference between the load current, $I_L$, and the average current command and is proportional to the supplemental current $I_B$ to be provided by the system 10. The difference signal is applied to a gain stage 26, the output of which is integrated by an integrator 28 to provide a speed command signal which is linear in response to a constant current demand.

In the absence of an overcurrent condition as discussed below, the output of the integrator 28 is combined at a summing junction 30 with a signal from a speed control loop generally designated 32. The speed control loop 32 includes a sensor 34 for sensing the speed of the motor 16. The sensed motor speed is compared by a summing junction 36 with a reference signal which is set at a level corresponding to the desired speed of the motor to provide the speed signal applied to the summing junction 30.

The speed signal, biased by the output of the integrator 28, is applied to a voltage to frequency converter 38 from the summing junction 30. The voltage to frequency converter 38 provides to an inverter logic control 40 a signal, the frequency of which determines the speed of the motor 16. In order to prevent an overcurrent condition, an overcurrent control 42 determines whether the current is at a positive or negative current limit. If the current is at a limit, the control 42 provides to a summing junction 44 an output signal which overrides the speed control loop 32 to sharply bias the speed of the motor to reduce the current.

Figure 2:
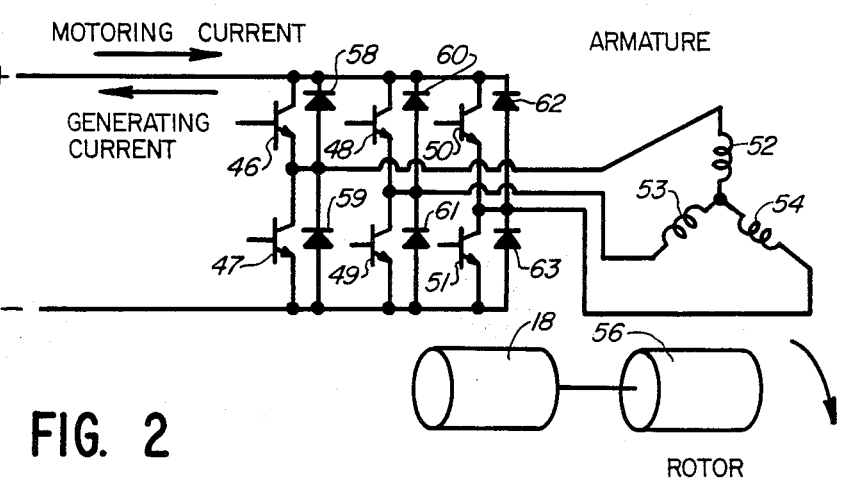
FIG. 2 is a schematic diagram of the inverter, motor and inertia device of the system of FIG. 1.

As shown in FIG. 2, the inverter 20 includes six transistors, 46–51, connected between the positive and negative terminals of the battery 12 and an induction motor 16 to form a half-bridge inverter. The inverter 20 further includes diodes or rectifiers 58–63, each connected in parallel with a respective transistor 46–51. Each pair of transistors, 46, 47; 48, 49; and 50, 51 is connected to a difference phase of an armature winding 52, 53 and 54 of the induction motor 16 having a rotor 56 coupled to the inertia device 18. The logic control 40 is coupled to the base of each of the transistors 46–51 to provide the switching logic for the transistors of the inverter which, when powered by the D.C. motoring current from the battery, provides an A.C. voltage to the induction motor during the "off" portion of the pulsed load. The motor in turn drives the inertia device which accelerates during this period, storing energy. During the "on" portion of the pulsed load, the inertia device decelerates, discharging energy through the motor and rectifiers 58–63 of the inverter to provide the D.C. generating current applied to the load 14 to supplement the current supplied by the battery.

Figure 3:
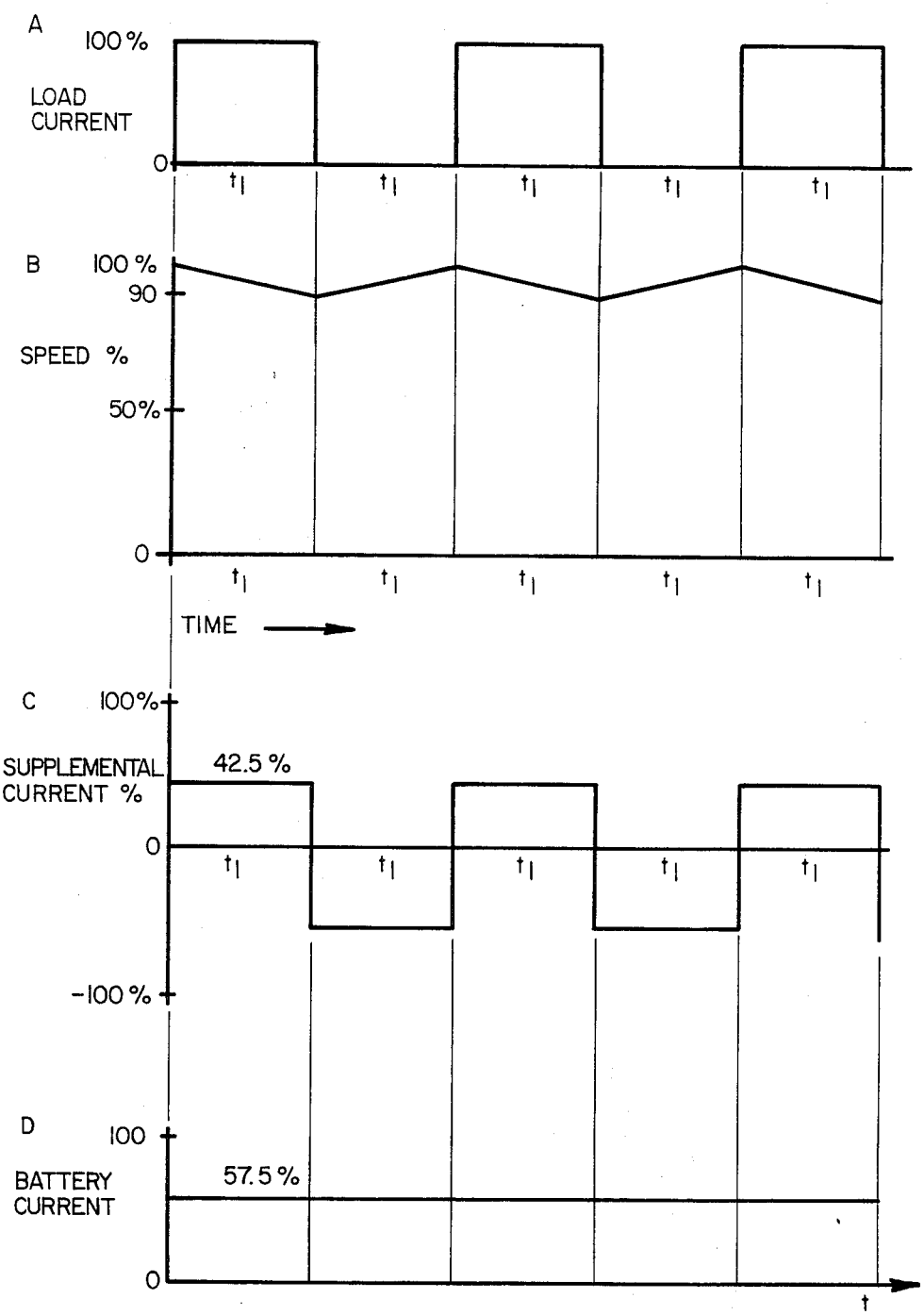
FIGS. 3A-D are graphs illustrating the operation of FIG. 1 for a 50% duty cycle system, the graphs representing respectively the load current, speed of the inertia device, supplemental current and battery current with respect to time.

FIGS. 3A–3D illustrate the operation of the electromagnetic energy storage and supply system 10 in supplementing the battery 12 to provide a load current with a 50% duty cycle as shown in FIG. 3A. During the "on" time of the load, the inertia device 18 decelerates as shown in FIG. 3B, discharging energy through the motor 16 and inverter 20 to provide that portion of the load current which is above the average load current commanded, the supplemental current provided by the system 10 being approximately 50% for a pulsed load with a 50% duty cycle. Because the system 10 may not be 100% efficient, the system actually provides less than 50% of the power, the battery 12 accounting for the system losses. Where the system 10 is to provide 50% of the power and the system efficiency is, for example, 85%, the losses will be approximately 50%×(100%−85%) or 7.5% so that the system 10 provides 42.5% of the current as shown in FIG. 3C and the battery 12 provides 57.5% as shown in FIG. 3D. Because the battery 12 provides only 57.5% of the power to the load 14, the weight of the battery is considerably less than a battery rated for peak power.

FIGS. 4A–4D illustrate the operation of the energy storage and supply system 10 in supplementing the battery 12 to provide a load current with a 10% duty cycle as shown in FIG. 4A. Where the system 10 is to provide 90% of the power and the system efficiency is again 85%, the system losses during the "on" period of the load will be approximately 13.5%. During the "off" period of the load, the power level of the system is 10% resulting in 1.5% losses. Therefore, during the "on" period of the pulse load, the system 10 supplies 76.5% of the power whereas the battery 12 provides 23.5. During the off period of the load, the battery supplies 10%+1.5% or 11.5% of the current which is stored by the system 10. Because the battery 12 provides at most 23.5% of the load current, the size and weight of the battery may further be reduced.

The electromagnetic energy storage and supply system 10 of the present invention supplements the battery 12 to provide that portion of the load current which is above the average load current commanded. The system therefore allows the battery 12 to be sized to provide only the average power to the load plus power to compensate for losses of the system 10. This results in a considerable reduction in the weight of the battery.

I claim:

1. In a system having a main power supply for providing D.C. current to a pulsed load with on and off periods, improved means for supplementing the main power supply comprising:

means for sensing the load current;

means for comparing the sensed load current to an average current command to provide a difference signal proportional to a desired supplemental current to be provided to the load;

a motor;

means for sensing the speed of the motor to provide a signal representative thereof;

means for comparing the motor speed signal to a reference speed signal to provide an output signal representing the difference therebetween;

an inertia device coupled to the motor for storing and discharging energy;

means for combining the difference signal with the output signal from the comparing means representing the difference between the motor speed and the reference speed to provide a speed command signal; and an inverter coupled between said main power supply and said motor and controlled in response to said speed command signal to provide an A.C. voltage to the motor to drive the inertia device during the off period of the pulse load, the inertial device, when driven by the motor, being accelerated to store energy from the main power supply, said inertia device decelerating during the on period of the pulse load to discharge energy through said motor and inverter and provide a D.C. current to the load to supplement the main power supply.

2. The system of claim 1 wherein the inverter includes a plurality of transistors coupled to form a half-bridge inverter, the system further including control logic means coupled to the transistors of said inverter and responsive to said speed command signal from the combining means to provide control signals to the transistors, turning the transistors on and off to provide the A.C. voltage to the motor during the off period of the pulsed load.

3. The system of claim 2 wherein said inverter includes a plurality of rectifiers, each rectifier coupled across a transistor to provide the D.C. current to the load during the on period of the pulsed load.

4. The inverter of claim 1 further including means coupled between the inverter and the combining means for sensing an overcurrent condition to provide a signal to the combining means for biasing the speed command signal to reduce the current.

* * * * *